2,935,516

SELECTIVE EPOXIDATION PROCESS FOR PRODUCING ESTERS OF EPOXY ALCOHOLS AND ALKENOIC ACIDS

Frederick C. Frostick, Jr., and Benjamin Phillips, Charleston, W. Va., assignors to Union Carbide Corporation, a corporation of New York No Drawing. Application November 13, 1957
Serial No. 696,042

7 Claims. (Cl. 260—348.5)

This invention relates to a novel process for producing esters of epoxy alcohols and alkenoic acids. In a particular aspect, this invention relates to a new and convenient method of synthesizing esters of epoxy alcohols and polymerizable alpha, beta-unsaturated carboxylic acids, and to useful products obtained therefrom.

Esters of epoxy alcohols and polymerizable unsaturated carboxylic acids are valuable compounds which are useful as plasticizers, as stabilizers for vinyl halide resins, and as monomers for the production of plastic and polymeric materials. Various methods are known for synthesizing these compounds. One method is by the reaction of an epoxy alcohol with an unsaturated acid anhydride or acid halide. United States Patent No. 2,567,842 describes another method which involves the reaction of an alkali metal salt of an unsaturated acid with epichlorohydrin. The known methods suffer from various disadvantages. The products are sometimes not easily separated from the reaction mixtures and low yields are commonly obtained. In some cases, more than one reaction step is necessary.

One of the objects of this invention is to provide a process for producing esters of epoxy alcohols and alpha, beta-unsaturated carboxylic acids which proceeds easily and cleanly in a single operation under mild conditions and affords high yields of pure products. Various other objects and advantages of the present invention will become apparent to those skilled in the art from the accompanying description and disclosure.

Accordingly, the objects are accomplished by a selective epoxidation process which comprises reacting together an epoxidizing agent and an ester corresponding to the formula:

$$H-\overset{R_1}{\underset{|}{C}}=\overset{R_2}{\underset{|}{C}}-\overset{O}{\underset{\|}{C}}-O-(CH_2)_x-\overset{R_3}{\underset{|}{C}}=\overset{R_4}{\underset{|}{C}}-R_5$$

wherein $R_1$ through $R_5$ are selected from the group consisting of hydrogen and hydrocarbon substituents, and at least one of $R_1$ and $R_2$ is hydrogen; X is an integer which varies from 1 to 5; said reaction being conducted for a period of time sufficient to consume up to one mole of epoxidizing agent per mole of said ester thus introducing an oxirane oxygen atom into the alcohol residue of said ester.

The hydrocarbon substituents designated by $R_1$ through $R_5$ in the above ester formula can be alkyl, aryl, aralkyl, alkaryl and cycloalkyl groups such as methyl, ethyl, propyl, isopropyl, butyl, amyl, isoamyl, hexyl, 2-ethylhexyl, octyl, 3,5-dimethyloctyl, decyl, dodecyl, octadecyl, cyclopentyl, cyclohexyl, phenyl, tolyl, butylphenyl, benzyl, phenethyl, phenylpropyl and the like. The preferred hydrocarbon substituents designated by $R_1$ through $R_5$ are the lower alkyl groups containing from 1 to 8 carbon atoms.

This invention is preferably employed in the epoxidation of esters which have alpha, beta-olefinic unsaturation in the acid portion of the ester and have one olefinic unsaturation in the alcohol portion, the unsaturation in said alcohol being in a position other than the vinyl position, i.e., at least one carbon atom removed from the ester group

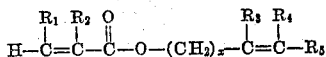

For example, a representative group of esters useful in this invention includes allyl acrylate, allyl crotonate, allyl 2-hexenoate, crotyl acrylate, crotyl crotonate, methallyl acrylate, methallyl crotonate, methallyl 2-heptenoate, 4-pentenyl crotonate, 5-heptenyl acrylate, allyl α-cyclohexyl acrylate, allyl α-cyclopentylacrylate, 3-butenyl α-ethylacrylate and the like.

The ester starting materials may be synthesized by the well-known methods described in the chemical literature. Excellent yields of ester product can be realized by reacting an appropriate unsaturated alcohol with an appropriate alpha, beta-unsaturated acid or ester-forming acid derivative thereof, such as the acid anhydride or the acid halide form of the carboxylic acid.

The epoxidation reactions are preferably conducted with peracetic acid as the epoxidizing agent. Peracetic acid is economically prepared in high purity, and it reacts smoothly and rapidly under mild conditions to produce substantially theoretical yields of epoxide product. Peracetic acid has advantages over other epoxidizing agents in the processes of this invention. However, other epoxidizing agents may be employed if convenient, e.g., acetaldehyde monoperacetate, perbenzoic acid, monoperphthalic acid and the like.

The particular manner of adding reactants to a reaction vessel in the processes of this invention is not critical. One convenient method is to slowly add a solution of peracid in an inert solvent such as ethyl acetate, ether or acetone, to the unsaturated ester. The reaction temperature can vary between 0° and 100° C., with 20° to 60° C. being the preferred temperature range. The length of time for a reaction to go to completion, i.e., the period of time sufficient to consume up to one mole of epoxidizing agent per mole of said ester, is dependent on the concentration and kind of peracid used, the reaction temperature and the nature of the particular unsaturated ester being oxidized. Depending on the variables illustrated above, the reaction time can vary from about one to about sixteen hours, and longer. At the lower range of temperatures, the reaction rate is comparatively slow. At temperatures above 75° C. the reaction rate is rapid but undesirable side reactions sometimes occur. These side reactions might involve epoxidation of the alpha, beta-unsaturation in the acid moiety, polymerization of the unsaturated ester, formation of a polyoxyethylene residue, or scission of the desired alcohol epoxide group with water or acid.

It has been observed that the instant epoxidation reaction is highly selective, that is, epoxidation occurs at the ethylenic unsaturation in the alcohol residue of the ester. This selective epoxidation occurs even though the epoxidizing agent can be employed in an excessive amount, i.e., more than one mole of epoxidizing agent per mole of unsaturated ester.

The mole ratio of the epoxidizing agent and the unsaturated ester which is to be selectively epoxidized may vary over a wide range. If a large excess of unsaturated ester is used, then the oxidation proceeds rapidly and cleanly and all of the epoxidizing agent is consumed, and the reaction product is obtained as a solution in the excess ester. This type of reaction is useful when the epoxide product can be easily separated from the unreacted ester. When approximately equal molar quantities of reactants are combined, the reaction rate decreases considerably toward the end of the reaction period and it is more difficult to approach the theoretical yield of product. It has been found most convenient to employ a small excess of epoxidizing agent. The molar ratios most preferred are those in which the epoxidizing agent is reacted in an amount between five and twenty-five mole percent in excess of the unsaturated ester. With these preferred mole ratios of reactants, the rate of reaction is satisfactory and excellent yields are obtained. Usually the reacting medium is analyzed for epoxidizing agent as the reaction proceeds and when the theoretical amount of epoxidizing agent has been consumed, i.e., when the unsaturation in the alcohol residue of the ester has been epoxidized, then the reaction is terminated and the product is recovered. If more than twenty-five mole percent excess of epoxidizing agent is employed, then the reaction rate will be somewhat increased and the concentration of the epoxidizing agent must be determined more often and more carefully in order not to allow the alpha, beta-unsaturation of the acid portion of the ester to be epoxidized. With due consideration to all the advantages and disadvantages of the various mole ratios of reactants, the processes of this invention are preferably conducted with a small excess of the epoxidizing agent, i.e., a little more than one mole of epoxidizing agent for every mole of alkenyl ester. A certain amount of epoxidizing agent is lost through decomposition and is unavailable for reaction with the alkenyl ester.

The analysis for determining the concentration of epoxidizing agent in a solution can be performed by introducing 1.0 to 1.5 grams of the solution containing epoxidizing agent into a flask containing a mixture of 60 milliliters of 50 weight percent aqueous sulfuric acid solution and 5 milliliters of a saturated potassium iodide solution. The flask is swirled to mix the solution and then titrated immediately with 0.1 N aqueous sodium thiosulfate solution to a colorless endpoint. From the titration data thus obtained, a determination of epoxidizing agent content can be made.

The following reaction scheme illustrates a particular embodiment of a process of this invention:

$$CH_3(CH_2)_3CH=CHCO_2(CH_2)_3CH=CH_2 + CH_3CO_3H \longrightarrow$$

4-pentenyl 2-heptenoate      peracetic acid

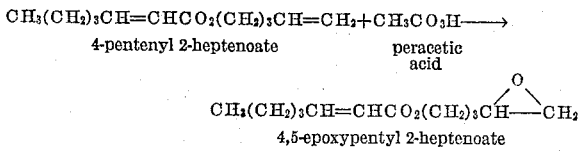

4,5-epoxypentyl 2-heptenoate

The inclusion of a small amount of a vinyl polymerization inhibitor in the epoxidation reactions has been found to be advantageous. Although their use is not essential for the proper conduct of the processes, better yields and cleaner products are attainable when an inhibitor is added to a reaction mixture at the onset of the reaction and/or in the distillation of the olefinic epoxy ester product. The inhibitor may be employed in amounts up to about 10 weight percent based on the quantity of ester charged to the reaction. Typical vinyl polymerization inhibitors hydroquinone, trinitrobenzene, 2,4-dinitrophenol, 2,4-dinitro-m-cresol, dinitrochlorophenol and the like.

In working up reaction product mixtures, the recovery of the epoxide ester is accomplished by using distillation or extraction or any other convenient means to separate the ester product from the solvent and any excess epoxidizing agent or unsaturated ester, and any side product formed in the reaction, such as the acid residue from a peracid reagent. It is sometimes preferred to add the reaction mixture to a still kettle containing an azeotroping solvent. For example, when a peroxidation reaction is accomplished by the use of a solution of peracetic acid in acetone, the reaction product solution may be added dropwise to a distillation apparatus containing refluxing ethylbenzene. Acetone, peracetic acid, acetic acid and ethylbenzene are distilled off during the addition. The epoxide product is contained in the residual material that remains after the low boiling components of the product mixture have been removed. The crude epoxide product can usually be purified by distillation at pressures of from one to ten millimeters of mercury.

The methods of this invention provide compounds which are not only useful as plasticizers and as stabilizers for vinyl halide resins but are also valuable as polymer-forming monomers by virtue of the two dissimilar polymer-forming groups contained in the molecule, i.e., the epoxide group and an olefinic group. Thus, a typical ester such as 2,3-epoxybutyl acrylate contains an epoxide group in the alcohol portion of the molecule and an olefinic group in the acid portion of the molecule. These two dissimilar groups form polymers by entirely different reaction mechanisms. The ester can be subjected to conditions whereby polymerization occurs through one group to the exclusion of polymerization through the other group. The resulting polymer can then be further polymerized under different conditions through the unaffected second group so that an infusible and insoluble polymer is formed. For example, an epoxyalcohol 2-alkenoate product of this invention can be copolymerized with vinyl chloride to give a copolymer containing unreacted epoxide groups which then can be crosslinked by treatment with acid or base to induce reaction of the available epoxide groups. Or, on the other hand, a product of this invention can be copolymerized with ethylene oxide to form a copolymer which contains double bonds capable of crosslinking by treatment with a peroxide or by heat at an elevated temperature. The dissimilarity of the polymer-forming groups enables control over polymer formation so as to produce polymers having a great variety of properties not heretofore possible.

The foregoing described useful compounds are prepared by the novel processes of this invention in a manner which is superior to other methods, known heretofore, in ease of performance and in the quantity and purity of product yield. The particularly preferred processes of this invention are those in which peracetic acid is employed as the epoxidizing agent. Peracetic acid is commercially available and it appears to be one of the most attractive epoxidizing reagents known from the viewpoints of economy, ease of reaction and product yield. By the use of peracetic acid, it is possible to produce close to theoretical yields of product in a one-step operation under mild conditions, and recover the product in a pure state with comparative ease. Where other epoxidizing agents may take days or weeks to yield a satisfactory product, peracetic acid will react in minutes or hours to yield the desired epoxidized material.

The following examples will serve to illustrate particular embodiments of this invention.

EXAMPLE 1

*The preparation of 2,3-epoxybutyl acrylate*

Crotyl alcohol (1800 grams, 25 moles), acrylic acid (1140 grams, 15.8 moles), p-toluenesulfonic acid (8.0 grams), trinitrobenzene inhibitor (3.0 grams) and benzene (440 grams) were placed in a flask fitted with a packed column and an esterification head and refluxed for twenty-four hours. During this time 360 grams of a lower layer were removed at the still head. The catalyst was neutralized by the addition of ten grams of sodium acetate and the product was fractionally distilled. There was obtained 1473 grams (74% yield) of crotyl acrylate, boiling point 55° C. at a pressure of 15 millimeters of mercury, $n_D^{30}$ 1.4363, to which was added 0.1% by weight of trinitrobenzene inhibitor.

To crotyl acrylate (300 grams, 2.38 moles) in a flask fitted with a stirrer, thermometer and dropping funnel, was added one gram of trinitrobenzene inhibitor, and then 890 grams of a 25% solution of peracetic acid in acetone (223 grams, 2.93 moles of peracetic acid) was added dropwise to the stirred contents of the flask at a temperature of 30–35° C. over a period of four hours. After the addition, the reaction was continued for eleven and one-half hours at a temperature of 30–35° C. and then for six hours at 50°–55° C. At the end of this period, an analysis for peracetic acid indicated that 97.6% of the theoretical amount had reacted. Low boiling materials were removed from the reaction medium under reduced pressure, the temperature in the flask never rising above 35° C. The high boiling residue remaining in the flask was dissolved in an equal volume of ether and extracted with water at 0°–5° C. The oil layer was then flash distilled on a one-plate column and there was obtained 218 grams of distillate, boiling point 35°–60° C. at a pressure of 5 millimeters of mercury, which was mixed with ether and benzene and extracted with cold saturated sodium bicarbonate solution. After separation, the oil layer was fractionated on a 12-inch packed column. During the distillation, a solution of trinitrobenzene inhibitor in earlier distilled fractions was added dropwise at the top of the column. There was obtained 111 grams (33% yield) of purified 2,3-epoxybutyl acrylate, boiling point 46.5° C. at a pressure of 5-millimeters of mercury, $n_D^{30}$ 1.4381, which analyzed 99.5% pure by determination of epoxide groups by the pyridine-hydrochloride method and 97.9% pure by determination of unsaturation by addition of bromine.

EXAMPLE 2

*The preparation of 2,3-epoxybutyl crotonate*

A mixture of crotyl alcohol (2017 grams, 29.2 moles), crotonic acid (1419 grams, 16.5 moles), p-toluenesulfonic acid (6 grams) and benzene (500 grams) was refluxed in a still until no more water was formed in the head. The catalyst was neutralized with sodium acetate (6 grams) and fractionation of the reaction mixture yielded 1083 grams (47% yield) of crotyl crotonate, boiling point 82° C. at a pressure of 19 millimeters of mercury, $n_D^{30}$ 1.4482, which analyzed as follows: Saponification equivalent, 140 (theory: 140); C, 68.34% (theory: 68.54%); H, 8.70% (theory: 8.62%).

Crotyl crotonate (420 grams, 3.0 moles) was charged to a reaction flask, and 1600 grams of a 22.6% solution of peracetic acid in acetone (360 grams, 4.74 moles of peracetic acid) was added dropwise to the stirred contents of the reaction flask at a temperature of 50°–55° C. over a period of five and one-half hours. After the addition was completed, the reaction was continued for seven more hours. At the end of this reaction period analysis for peracetic acid showed that the theoretical amount had reacted. The reaction mixture was then added dropwise to a still containing ethylbenzene refluxing at a pressure of 25 millimeters of mercury. During the addition, acetone, acetic acid, peracetic acid and ethylbenzene were removed at the head. After all of the reaction mixture was added the excess ethylbenzene was stripped off leaving a residue product (516 grams) which analyzed for 0.58% acidity as acetic acid and 74% as 2,3-epoxybutyl crotonate by determination of epoxide groups by the pyridine-hydrochloride method. The yield of crude product was 81.5%.

This product was combined with the product from a similar run and then fractionated to give pure 2,3-epoxybutyl crotonate, boiling point 67°–78° C. at a pressure of 1–2 millimeters of mercury, $n_D^{30}$ 1.4492, $d_4^{25}$ 1.0263, in 70.5% overall yield. The product analyzed 0.1% acidity as acetic acid and 98.8% as 2,3-epoxybutyl crotonate by determination of epoxide groups by the pyridine-hydrochloride method.

EXAMPLE 3

*The preparation of 2,3-epoxy-2-methylpropyl crotonate*

A mixture of crotonic anhydride (308 grams, 2.0 moles) and p-toluenesulfonic acid (1.0 gram) was heated to a temperature of 60°–65° C. and methallyl alcohol (169 grams, 2.2 moles) was added dropwise over a period of seventy-five minutes. After the addition was completed, the reaction mixture was stirred at a temperature of 60°–65° C. for one more hour and then cooled to room temperature. Crotonic acid crystallized out of the reaction mixture and was removed by filtration. The remaining liquid was treated with sodium acetate to neutralize the catalyst, then the mixture was distilled to give 219 grams of distillate, boiling point 91° C./50°–95° C. at a pressure of 47 millimeters of mercury and 132 grams of residue (crotonic acid). The distillate was extracted with sodium bicarbonate solution to remove acid components, then the remaining material was fractionated to yield 181 grams of methallyl crotonate, boiling point 89°–90° C. at a pressure of 40 millimeters of mercury, $n_D^{30}$ 1.4451, $d_4^{26}$ 0.9211, which analyzed 0.1% acidity as crotonic acid, 99.4% purity by bromination, and gave a saponification equivalent of 140.5 (theory: 140).

Methallyl crotonate (168 grams, 1.2 moles) was placed in a reaction flask and 555 grams of a 24.7% solution of peracetic acid in acetone (137 grams, 1.8 moles of peracetic acid) was added dropwise at a temperature of 40°–45° C. over a period of one hundred minutes. After the addition was completed, the reaction mixture was maintained at a temperature of 40°–45° C. for nine and one-half hours longer. The reaction mixture was cooled and then added dropwise to ethylbenzene refluxing in a still at a pressure of 25 millimeters of mercury. During the addition, acetone, acetic acid, peracetic acid and ethylbenzene were removed at the head. After the addition of the reaction mixture was completed, the excess ethylbenzene was removed by distillation. There was obtained a residue product (182 grams) which analyzed 91.5% as 2,3-epoxy-2-methylpropyl crotonate by epoxide determination. This product was distilled and there was obtained 134 grams (72% yield) of 2,3-epoxy-2-methylpropyl crotonate, boiling point 66°–68° C. at a pressure of 2 millimeters of mercury, $n_D^{30}$ 1.4490, $d_4^{26}$ 1.263, which analyzed 97.4% purity by epoxide determination.

*Anal.*—Calc. for ($C_8H_{12}O_3$): C, 61.5; H, 7.75. Found: C, 61.1; H, 7.67.

EXAMPLE 4

*The preparation of 2,3-epoxypropyl crotonate*

Allyl crotonate (269 grams, 2.13 moles) containing trinitrobenzene inhibitor (1.0 grams) was placed in a reaction flask fitted wtih a stirrer, thermometer and dropping funnel and heated to a temperature of 50° C. Then 237 grams of a 22.8% solution of peracetic acid in acetone (54 grams, 0.71 mole of peracetic acid) was added dropwise with stirring to the contents of the reaction flask over a period of forty minutes. After the addition was completed, the reaction was allowed to proceed for an additional twenty-one hours. At the end of this period, an analysis for unreacted peracetic acid showed that 91.2% of the theoretical amount had been consumed.

The reaction mixture was then added dropwise to a still containing ethylbenzene refluxing at a pressure of 35 millimeters of mercury. During the addition, a mixture of acetic acid, peracetic acid, acetone and ethylbenzene was removed in the still head. After the reaction mixture addition was completed, the remaining ethylbenzene was stripped off under low pressure and there was obtained a residue product (293 grams) of liquid which analyzed 23.9% as 2,3-epoxypropyl crotonate by determination of epoxide groups by the pyridine-hydrochloride method. This product was flash distilled and then fractionated to yield 40.5 grams (40% yield) of pure 2,3-epoxypropyl crotonate, boiling point 60° C. at a pressure of 1.5 millimeters of mercury, $n_D^{30}$ 1.4552.

What is claimed is:

1. A selective epoxidation process for producing esters of epoxy alcohols and alpha, beta-olefinically unsaturated carboxylic acids which comprises reacting together, at a temperature between about 0° C. and 100° C. a peracid epoxidizing agent and an ester corresponding to the formula:

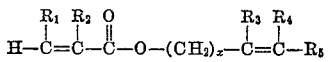

wherein $R_1$ through $R_5$ are selected from the group consisting of hydrogen and lower alkyl substituents, and at least one of $R_1$ and $R_2$ is hydrogen; X is an integer which varies from 1 to 5; said reaction being conducted for a period of time sufficient to consume up to one mole of epoxidizing agent per mole of said ester thus introducing an oxirane oxygen atom into the alcohol residue of said ester.

2. A selective epoxidation process for producing esters of epoxy alcohols and alpha, beta-olefinically unsaturated carboxylic acids which comprises reacting together, at a temperature between 0° and 75° C., peracetic acid and an ester corresponding to the formula:

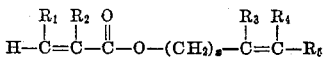

wherein $R_1$ through $R_5$ are selected from the group consisting of hydrogen and lower alkyl substituents, and at least one of $R_1$ and $R_2$ is hydrogen; X is an integer which varies from 1 to 5; said reaction being conducted for a of time sufficient to consume up to one mole of peracetic acid per mole of said ester thus introducing an oxirane oxygen atom at the olefin position in the alcohol residue of said ester.

3. The process of claim 2 wherein said peracetic acid is employed in an inert organic solvent.

4. The method of claim 2 wherein the epoxidation reaction is conducted in the presence of a vinyl polymerization inhibitor.

5. A process for producing 2,3-epoxybutyl acrylate which comprises reacting together, at a temperature between 0° and 75° C., peracetic acid and crotyl acrylate for a period of time sufficient to consume up to one mole of peracetic acid per mole of crotyl acrylate.

6. A process for producing 2,3-epoxybutyl crotonate which comprises reacting together, at a temperature between 0° and 75° C., peracetic acid and crotyl crotonate for a period of time sufficient to consume up to one mole of peracetic acid per mole of crotyl crotonate.

7. A process for producing 2,3-epoxy-2-methylpropyl crotonate which comprises reacting together, at a temperature between 0° and 75° C., peracetic acid and methyallyl crotonate for a period of time sufficient to consume up to one mole of peracetic acid per mole of methallyl crotonate.

References Cited in the file of this patent

UNITED STATES PATENTS

| | | |
|---|---|---|
| 2,493,090 | Shelton et al. | Jan. 3, 1950 |
| 2,524,432 | Dorough | Oct. 3, 1950 |
| 2,556,075 | Erickson | June 5, 1951 |
| 2,680,109 | Stevens et al. | June 1, 1954 |
| 2,730,531 | Payne et al. | Jan. 10, 1956 |
| 2,794,029 | Philips et al. | May 28, 1957 |

OTHER REFERENCES

Braun: J.A.C.S., vol. 52, pp. 3185–88 (1930).
Swern: J.A.C.S., vol. 69, pp. 1692–1698.
Elderfield: Heterocyclic Compounds, vol. 1, pp. 5 and 6 (1950).

UNITED STATES PATENT OFFICE
CERTIFICATE OF CORRECTION

Patent No. 2,935,516                         May 3, 1960

Frederick C. Frostick, Jr., et al.

It is hereby certified that error appears in the printed specification of the above numbered patent requiring correction and that the said Letters Patent should read as corrected below.

Column 7, line 27, after "for a" insert -- period --.

Signed and sealed this 25th day of October 1960.

(SEAL)
Attest:

KARL H. AXLINE
Attesting Officer

ROBERT C. WATSON
Commissioner of Patents